United States Patent
Kujawa et al.

(10) Patent No.: US 8,303,042 B2
(45) Date of Patent: Nov. 6, 2012

(54) DEPLOYABLE/STOWABLE SEAT MOUNTED SEAT BELT WEBBING COMFORT GUIDE

(75) Inventors: Peter P. Kujawa, Howell, MI (US); Gregory S. Ches, Clinton Township, MI (US); Leslie A. Sajovec, Beverly Hills, MI (US); Steven G. Corrion, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 34 days.

(21) Appl. No.: 12/821,202

(22) Filed: Jun. 23, 2010

(65) Prior Publication Data

US 2011/0316321 A1    Dec. 29, 2011

(51) Int. Cl.
*B60R 22/00* (2006.01)
*B60R 21/00* (2006.01)
(52) U.S. Cl. ....................................................... 297/473
(58) Field of Classification Search ............... 280/801.2, 280/801.1, 808; 297/473, 483
See application file for complete search history.

(56) References Cited

U.S. PATENT DOCUMENTS

| 6,474,691 | B2 * | 11/2002 | Izume et al. | 280/801.1 |
| 7,226,131 | B2 * | 6/2007 | Meneses et al. | 297/480 |
| 7,273,232 | B2 | 9/2007 | Fontecchio et al. | |
| 7,387,315 | B2 * | 6/2008 | Nett et al. | 280/801.1 |
| 7,815,256 | B2 | 10/2010 | Erlingstam et al. | |

* cited by examiner

*Primary Examiner* — Milton Nelson, Jr.

(57) ABSTRACT

A seat belt guide includes a housing defining an interior region, and a guide member at least partially disposed within the interior region. The guide member defines a channel for receiving and guiding a webbing of a seat belt. The guide member is moveable between a stowed position and a deployed position, with the channel concealed when in the stowed position, and the channel exposed when in the deployed position. The guide member includes a base portion and a guide portion, with the guide portion rotatable relative to the base portion to allow for automatic withdrawal of the webbing from the channel when the seat is moved into a position that does not require the use of the seat belt guide.

18 Claims, 3 Drawing Sheets

US 8,303,042 B2

DEPLOYABLE/STOWABLE SEAT MOUNTED SEAT BELT WEBBING COMFORT GUIDE

TECHNICAL FIELD

The invention generally relates to a seat belt guide for guiding a webbing of a seat belt.

BACKGROUND

Seats for vehicles, and particularly front seats of vehicles, include a seat belt guide for guiding a webbing of the seat belt. The seat belt guide is mounted on the seat, just above the shoulder. When the seats are positioned forward in the vehicle for smaller occupants, the webbing of the seat belt may pass over a shoulder of the occupant. The seat belt guide routes the seat belt away from the neck of the occupant when the seat is positioned forward. When the seat is positioned rearward in the vehicle for larger occupants, the seat belt guide is not required to properly position the webbing relative to the occupant, and the webbing of the seat belt may be disengaged from the seat belt guide.

SUMMARY

A seat belt guide is provided. The seat belt guide includes a housing. The housing defines an interior region extending along an axis. The interior region is open at a first end of the housing. A guide member is at least partially disposed within the interior region of the housing. The guide member defines a channel that is configured for receiving and guiding a seat belt. The guide member is moveable along the axis between a stowed position and a deployed position. The guide member is at least partially disposed beyond the first end of the housing to expose the channel when in the deployed position. The channel is concealed within the interior region of the housing when in the stowed position.

A seat for a vehicle is also provided. The seat includes a backrest and a seat belt guide attached to the backrest. The seat belt guide includes a housing. The housing defines an interior region extending along an axis. The interior region is open at a first end of the housing. The seat belt guide further includes a guide member at least partially disposed within the interior region of the housing. The guide member includes a base portion, a spacer portion and a guide portion. The spacer portion is disposed between and interconnects the base portion and the guide portion to axially space the guide portion from the base portion along the axis and define a channel therebetween. The guide portion is rotatably moveable relative to the base portion between a closed position and an open position. The guide portion is configured for securing and guiding a webbing of a seat belt when in the closed position. The guide portion is configured for releasing the webbing of the seat belt when in the open position.

Accordingly, the seat belt guide may be positioned in the stowed position when not in use to remove the guide member from sight, thereby improving the aesthetics of the seat. When needed, the guide member may be moved into the deployed position for use. Additionally, if the guide member is in the deployed position and the seat is moved rearward, the webbing of the seat belt provides a force against the guide portion of the guide member to move the guide portion into the open position, thereby allowing the webbing to automatically release from the seat belt guide when not required, which reduces the slack in the webbing of the seat belt.

The above features and advantages and other features and advantages of the present invention are readily apparent from the following detailed description of the best modes for carrying out the invention when taken in connection with the accompanying drawings.

DETAILED DESCRIPTION

Figure 1:
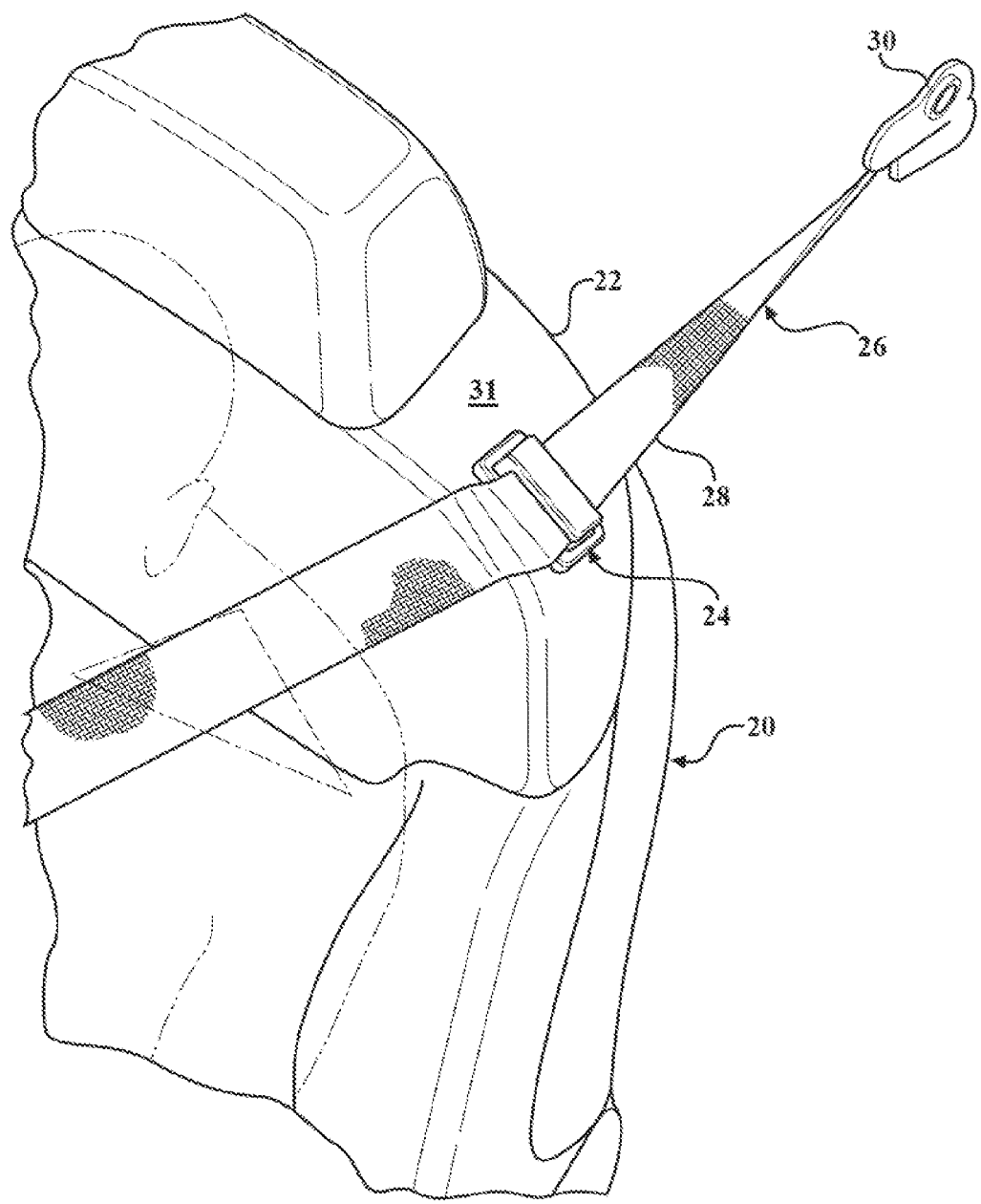
FIG. 1 is a schematic perspective view of a seat for a vehicle with a seat belt.

Referring to the Figures, wherein like numerals indicate like parts throughout the several views, a seat is shown generally at 20 in FIG. 1. Referring to FIG. 1, the seat 20 is for a vehicle, and includes a backrest 22 and a seat belt guide 24. The seat 20 and the backrest 22 may be configured in any suitable manner to accommodate any design requirements of the vehicle. Accordingly, the specific shape, size and configuration of the seat 20 and/or the backrest 22 are not pertinent to the description of the invention, and are not described in detail herein.

A seat belt system 26 is shown securing an occupant (shown in phantom in FIG. 1) to the seat 20. The seat belt system 26 includes a webbing 28 that is attached to the vehicle at an anchor point 30, and may be routed through the seat belt guide 24. The seat belt system 26 may include any suitable seat belt system 26 for use in a vehicle. Accordingly, the specific shape, size and configuration of the seat belt system 26 are not pertinent to the description of the invention, and are not described in detail herein.

The seat belt guide 24 is attached to the backrest 22 of the seat 20. The seat belt guide 24 may be recessed into a generally upper and outer surface 31 of the backrest 22, and may be shaped to conform to the contour of the backrest 22.

Figure 2:
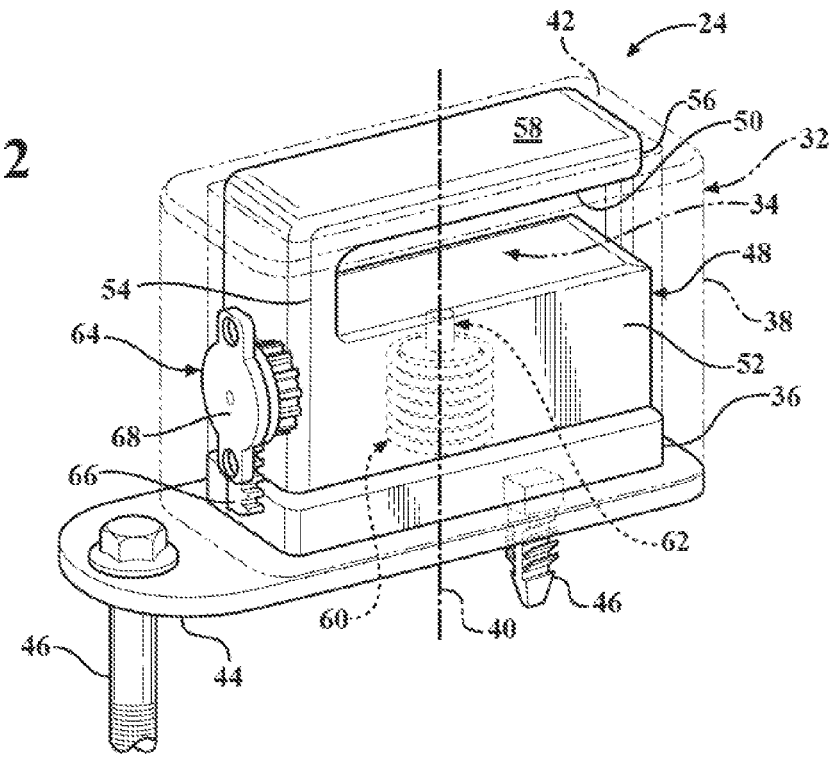
FIG. 2 is a schematic partial perspective view of a seat belt guide showing a guide member in a stowed position.
Figure 3:
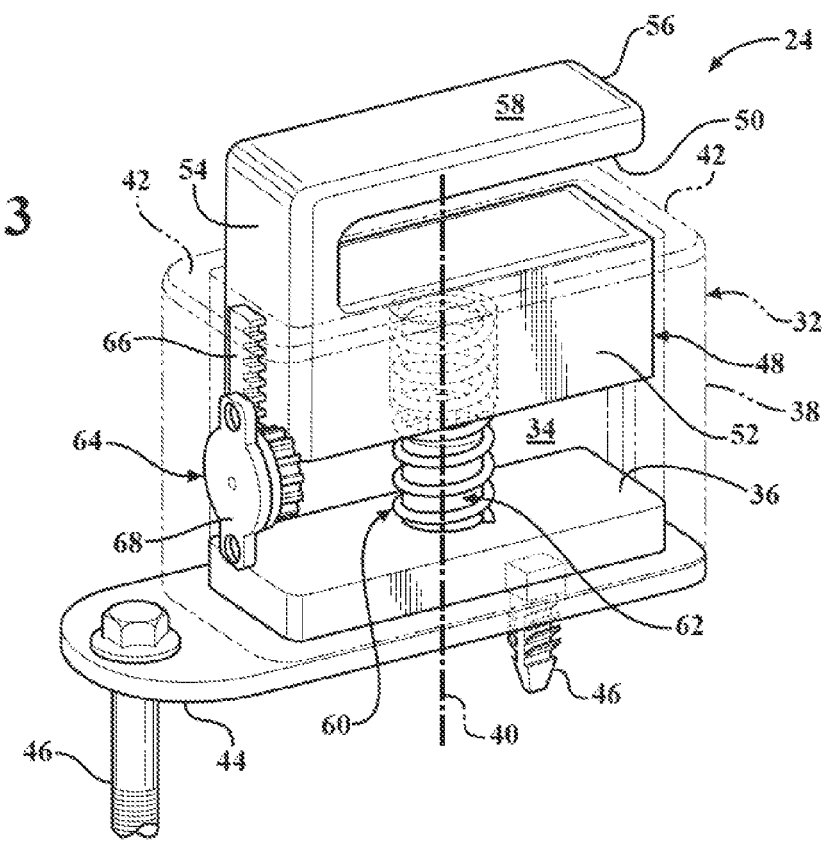
FIG. 3 is a schematic partial perspective view of the seat belt guide showing the guide member in a deployed position.

Referring to FIGS. 2 and 3, the seat belt guide 24 includes a housing 32 that defines an interior region 34, shown in FIG. 3. The housing 32 may include a base wall 36, a side wall 38. The base wall 36 and the side wall 38 cooperate to define the interior region 34. The side wall 38 generally surrounds the base wall 36 and extends from the base wall 36 along an axis 40 to a first end 42. Accordingly, the interior region 34 extends along the axis 40, and is open at the first end 42 of the side wall 38. It should be appreciated that the housing 32 may be configured other than shown and described herein, and still fall within the scope of the appended claims.

The seat belt guide 24 may include a mounting plate 44 that is attached to the housing 32. The mounting plate 44 is configured for attachment to a structural element of a vehicle. More specifically, the mounting plate 44 may be configured for attaching the seat belt guide 24 to the backrest 22 of the seat 20. The mounting plate 44 may include one or more fasteners 46 to secure the seat belt guide 24 to the structural element of the vehicle.

The seat belt guide 24 further includes a guide member 48. The guide member 48 is at least partially disposed within the interior region 34 of the housing 32. The guide member 48 defines a channel 50 for selectively receiving and guiding the webbing 28 of the seat belt system 26. More specifically, the guide member 48 includes a base portion 52, a spacer portion 54 and a guide portion 56. The spacer portion 54 is disposed between and interconnects the base portion 52 and the guide portion 56. The spacer portion 54 axially spaces the guide portion 56 from the base portion 52 along the axis 40 to define the channel 50 between the base portion 52 and the guide portion 56.

Smaller occupants of the seat 20 may desire to route the webbing 28 of the seat belt system 26 through the channel 50 of the guide member 48 when the seat 20 is positioned forward in the vehicle to move the webbing 28 away from the neck of the occupant. If the seat 20 is positioned rearward in the vehicle, the occupant may not need to route the webbing 28 through the channel 50 of the guide member 48 to move the webbing 28 away from the neck. Accordingly, when the seat 20 is positioned rearward in the vehicle, the occupant may choose not to route the webbing 28 through, or may remove the webbing 28 from, the channel 50 of the guide member 48.

The guide member 48 is moveable between a stowed position, shown in FIG. 2, and a deployed position, shown in FIG. 3. The guide member 48 may be moveable linearly along the axis 40, or alternatively, the guide member may be pivotally moveable within the interior region 34 to position the channel 50 outside the central region 34, in the deployed position. When in the stowed position, the channel 50 is concealed within the interior region 34 of the housing 32, and only a top surface 58 of the guide portion 56 of the guide member 48 is visible. In other words, when in the stowed position, the top surface 58 of the guide portion 56 is substantially flush with the first end 42 of the housing 32 and the outer surface 31 of the backrest 22. When in the deployed position, the guide member 48 is at least partially disposed beyond the first end 42 of the housing 32 to expose the channel 50. Accordingly, if the occupant desires to route the webbing 28 through the channel 50, the guide member 48 may be moved into the deployed position to expose the channel 50, as shown in FIG. 1. Alternatively, if the occupant does not require the webbing 28 to be routed through the channel 50, then the guide member 48 may be moved into the stowed position to conceal, i.e., hide, the guide member 48, thereby improving the aesthetics of the seat 20.

The seat belt guide 24 further includes a biasing device 60 is disposed within the interior region 34 of the housing 32. The biasing device 60 is configured for biasing the guide member 48 into the deployed position. Accordingly, the biasing device 60 is disposed between the base wall 36 and the guide member 48, and pushes on the guide member 48 and against the base wall 36 to urge the guide member 48 into the deployed position. The biasing device 60 may include a spring, including but not limited to, a coil spring. However, it should be appreciated that the biasing device 60 may include some other device capable of biasing the guide member 48 into the deployed position.

The seat belt guide 24 further includes a retention mechanism 62. The retention mechanism 62 is disposed within the interior region 34 of the housing 32. The retention mechanism 62 is configured for retaining the guide member 48 in the stowed position and releasing the guide member 48, when actuated, for movement into the deployed position. The retention mechanism 62 may include, but is not limited to, a push-push cylinder. The push-push cylinder releases the guide member 48 from the stowed position upon application of a force directed along the axis 40 inward into the interior region 34 of the housing 32. The push-push cylinder also secures the guide member 48 in the stowed position upon depressing the guide member 48 from the deployed position into the stowed position. It should be appreciated that the retention mechanism 62 may include some other mechanism not shown or described herein that is capable of selectively securing the guide member 48 in the stowed position and resisting the biasing force from the biasing device 60 urging the guide member 48 into the deployed position, and is also capable of releasing the guide member 48 for movement into the deployed position when actuated.

The seat belt guide 24 further includes a damper mechanism 64. The damper mechanism 64 interconnects the housing 32 and the guide member 48. The damper mechanism 64 is configured for damping, i.e., slowing, movement of the guide member 48 between the stowed position and the deployed position. The damper mechanism 64 may include a gear rack 66 disposed on the guide member 48, with a damper gear 68 coupled to the housing 32 and in meshing engagement with the gear rack 66. The damper gear 68 may include, but is not limited to, a fluid damper. Upon actuation of the retention mechanism 62, the guide member 48 begins to move along the axis 40 into the deployed position. As the gear rack 66 is attached to the guide member 48, the gear rack 66 also moves along the axis 40. The meshing engagement between the gear rack 66 and the damper gear 68 causes the damper gear 68 to rotate. Resistance within the damper gear 68 slows the movement of the gear rack 66, and thereby the guide member 48, into the deployed position to prevent sudden movement of the guide member 48 into the deployed position. It should be appreciated that the damper mechanism 64 may include some other mechanism not shown or described herein that is capable of slowing the movement of the guide member 48 from the stowed position into the deployed position.

Figure 4:
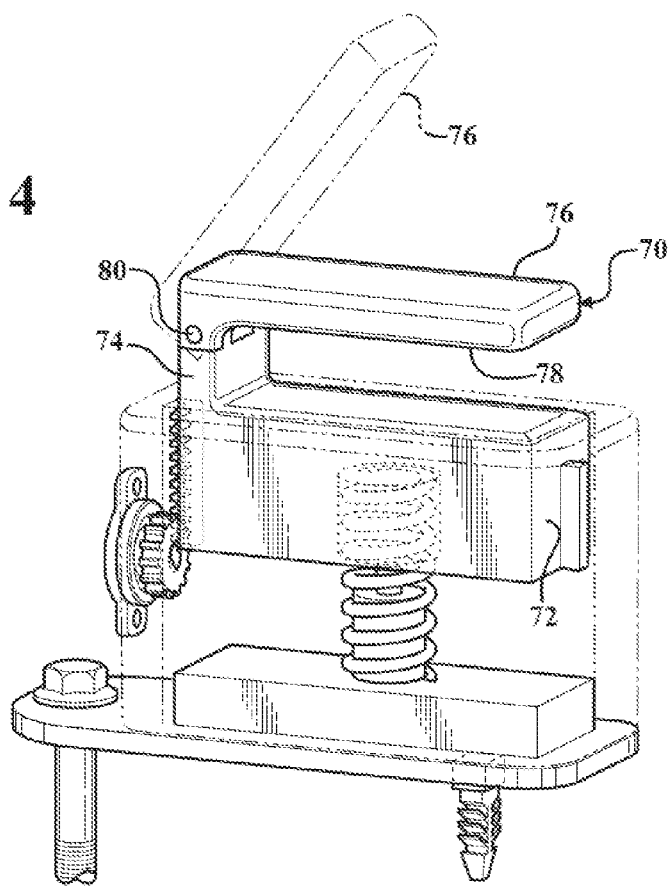
FIG. 4 is a schematic partial perspective view of an alternative embodiment of the seat belt guide showing a guide portion of the guide member in a closed position and an open position (shown in phantom).
Figure 5:
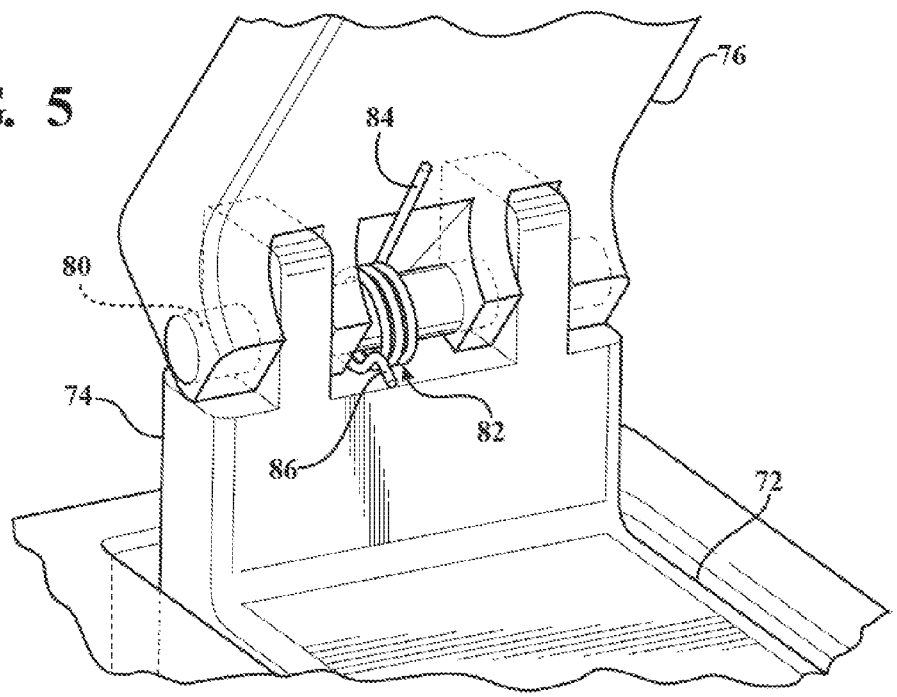
FIG. 5 is an enlarged schematic perspective view of the alternative embodiment of the seat belt guide.

Referring to FIGS. 4 and 5, an alternative embodiment of the guide member is shown generally at 70. The guide member 70 includes a base portion 72, a spacer portion 74 and a guide portion 76. The spacer portion 74 is disposed between and interconnects the base portion 72 and the guide portion 76 to define a channel 78 between the guide portion 76 and the base portion 72 for receiving the webbing 28 therein. The guide portion 76 is moveable between a closed position, (shown in solid lines in FIG. 4) and an open position (shown in phantom in FIG. 4 and in solid lines in FIG. 5). The guide portion 76 is configured for securing and guiding a webbing 28 of a seat belt when in the closed position, and for releasing the webbing 28 of the seat belt when in the open position.

The guide portion 76 is pivotably attached to the spacer portion 74. As shown, a pin 80 may rotatably connect the guide portion 76 to the spacer portion 74. However, it should be appreciated that the guide portion 76 may be rotatably attached to and supported by the spacer portion 74 and/or the base portion 72 in some other manner not shown or described herein.

The guide member 70 includes a biasing portion 82 interconnecting the guide portion 76 and the spacer portion 74. The biasing portion 82 biases the guide portion 76 into the closed position. For example, the biasing portion 82 may include, but is not limited to, a coil spring having a first arm 84 and a second arm 86. The first arm 84 may be coupled to the guide portion 76, and the second arm 86 may be coupled to the spacer portion 74 to draw the guide member 70 inwards toward the base portion 72. However, it should be appreciated that the biasing portion 82 may include some other device and may be configured in some other manner than shown and described herein.

The guide portion 76 is moveable in response to application of a pre-determined force directed along the longitudinal axis away from the housing 32. The pre-determined force is defined by the resistance to movement provided by the biasing portion 82. Accordingly, if the biasing portion 82 includes a spring, the pre-determined force is dependent upon the force provided by the spring.

Movement of the seat 20 from a position forward in the vehicle to a more rearward position in the vehicle, when the webbing 28 of the seat belt system is routed through the channel 78 of the guide member 70, may result in excess slack accumulating in the webbing 28. As the seat 20 is moved rearward, the webbing 28 may engage and provide a force to the guide portion 76 that is directed outward away from the interior region 34 of the housing 32. The moveable guide portion 76 of the guide member 70 permits this outwardly directed force generated by the webbing 28 on the guide portion 76 when the seat 20 is moved into a more rearward position to move the guide portion 76 into the open position, thereby automatically releasing the webbing 28 from the channel 78, and thereby removing any excess slack in the webbing 28.

While the best modes for carrying out the invention have been described in detail, those familiar with the art to which this invention relates will recognize various alternative designs and embodiments for practicing the invention within the scope of the appended claims.

The invention claimed is:

1. A seat belt guide comprising:
   a housing defining an interior region extending along an axis and open on a first end;
   a guide member at least partially disposed within the interior region of the housing and defining a channel configured for receiving and guiding a seat belt;
   wherein the guide member is moveable between a stowed position and a deployed position, with the guide member at least partially disposed beyond the first end of the housing to expose the channel when in the deployed position, and with the channel concealed within the interior region of the housing when in the stowed position; and
   a biasing device disposed within the interior region of the housing and configured for biasing the guide member into the deployed position.

2. A seat belt guide as set forth in claim 1 wherein the biasing device includes a coil spring.

3. A seat belt guide as set forth in claim 1 further comprising a retention mechanism disposed within the interior region of the housing and configured for retaining the guide member in the stowed position and releasing the guide member for movement into the deployed position when actuated.

4. A seat belt guide as set forth in claim 3 wherein the retention mechanism releases the guide member from the stowed position upon application of a force directed along the axis inward into the interior region of the housing.

5. A seat belt guide as set forth in claim 4 wherein the retention mechanism secures the guide member in the stowed position upon depressing the guide member from the deployed position into the stowed position.

6. A seat belt guide as set forth in claim 5 wherein the retention mechanism includes a push-push cylinder.

7. A seat belt guide as set forth in claim 3 further comprising a damper mechanism interconnecting the housing and the guide member and configured for damping movement of the guide member between the stowed position and the deployed position.

8. A seat belt guide as set forth in claim 7 wherein the damping mechanism includes a gear rack disposed on the guide member and a damper gear coupled to the housing and in meshing engagement with the gear rack.

9. A seat belt guide as set forth in claim 8 wherein the damping gear includes a fluid damper.

10. A seat belt guide as set forth in claim 1 wherein the guide member includes a base portion, a spacer portion and a guide portion, with the spacer portion disposed between and interconnecting the base portion and the guide portion to axially space the guide portion from the base portion along the axis.

11. A seat belt guide as set forth in claim 10 wherein the guide portion is moveable between a closed position and an open position, with the guide portion configured for securing and guiding a webbing of a seat belt when in the closed position, and the guide portion configured for releasing the webbing of the seat belt when in the open position.

12. A seat belt guide as set forth in claim 11 wherein the guide portion is pivotably attached to the spacer portion.

13. A seat belt guide as set forth in claim 12 wherein the guide portion is moveable in response to application of a pre-determined force directed along the longitudinal axis away from the housing.

14. A seat belt guide as set forth in claim 13 wherein the biasing portion interconnects the guide portion and the spacer portion.

15. A seat belt guide as set forth in claim 13 wherein the guide member includes a biasing portion biasing the guide portion into the closed position.

16. A seat for a vehicle, the seat comprising:
    a backrest;
    a seat belt guide attached to the backrest, the seat belt guide comprising:
       a housing defining an interior region extending along an axis and open on a first end;
       a guide member at least partially disposed within the interior region of the housing and including a base portion, a spacer portion and a guide portion, with the spacer portion disposed between and interconnecting the base portion and the guide portion to axially space the guide portion from the base portion along the axis and define a channel therebetween;
       wherein the guide member is moveable between a stowed position and a deployed position, with the guide member at least partially disposed beyond the first end of the housing to expose the channel when in the deployed position, and with the channel concealed within the interior region of the housing when in the stowed position; and
       a biasing device disposed within the interior region of the housing and configured for biasing the guide member into the deployed position;
       wherein the guide portion is rotatably moveable relative to the base portion between a closed position and an open position, with the guide portion configured for securing and guiding a webbing of a seat belt when in the closed position, and the guide portion configured for releasing the webbing of the seat belt when in the open position.

17. A seat as set forth in claim 16 wherein the guide member includes a biasing portion interconnecting the guide portion and the spacer portion and biasing the guide portion into the closed position.

18. A seat as set forth in claim 17 further comprising a retention mechanism, with the biasing device and the retention mechanism each disposed within the interior region of the housing, with the biasing device configured for biasing the guide member into the deployed position, and with the retention mechanism configured for retaining the guide member in the stowed position and releasing the guide member for movement into the deployed position when actuated.

* * * * *